United States Patent [19]

Bibl et al.

[11] Patent Number: 4,926,199
[45] Date of Patent: May 15, 1990

[54] HIGH RESOLUTION ELECTROSTATIC PLOTTER, PRINTER OR THE LIKE INCORPORATING A STATIONARY WRITING HEAD

[75] Inventors: Andreas Bibl, Los Altos; John Higginson, Santa Clara; Deane Gardner, Cupertino, all of Calif.

[73] Assignee: Rastergraphics, Inc., Sunnyvale, Calif.

[21] Appl. No.: 341,694

[22] Filed: Apr. 21, 1989

Related U.S. Application Data

[63] Continuation-in-part of Ser. No. 166,716, Mar. 11, 1988, Pat. No. 4,878,071.

[51] Int. Cl.$^5$ .............................................. G01D 15/00
[52] U.S. Cl. .................................. 346/157; 346/150
[58] Field of Search ............... 346/157, 150, 153.1, 346/101, 134, 136, 155, 139 C, 160.1

[56] References Cited

U.S. PATENT DOCUMENTS 4,761,669  8/1988  Langdon ............................. 346/157
4,792,860 12/1988  Kuehrle ............................. 346/157
4,847,655  7/1989  Parken et al. ..................... 346/157

Primary Examiner—Arthur G. Evans
Attorney, Agent, or Firm—Lyon & Lyon

[57] ABSTRACT

A multipass, multicolor electrostatic plotter or printer has a continuous vacuum transport belt rotatable for substantially a complete revolution past a stationary writing head. The vacuum transport belt provides a vacuum to the entire contacting surface of a recording medium to stabilize and register the recording medium with a previously unattainable degree of invariance, thereby enabling information to be printed upon the recording medium simply by moving the transport belt with respect to a stationary electrostatic writing head disposed for contacting the recording medium across its entire width.

7 Claims, 5 Drawing Sheets

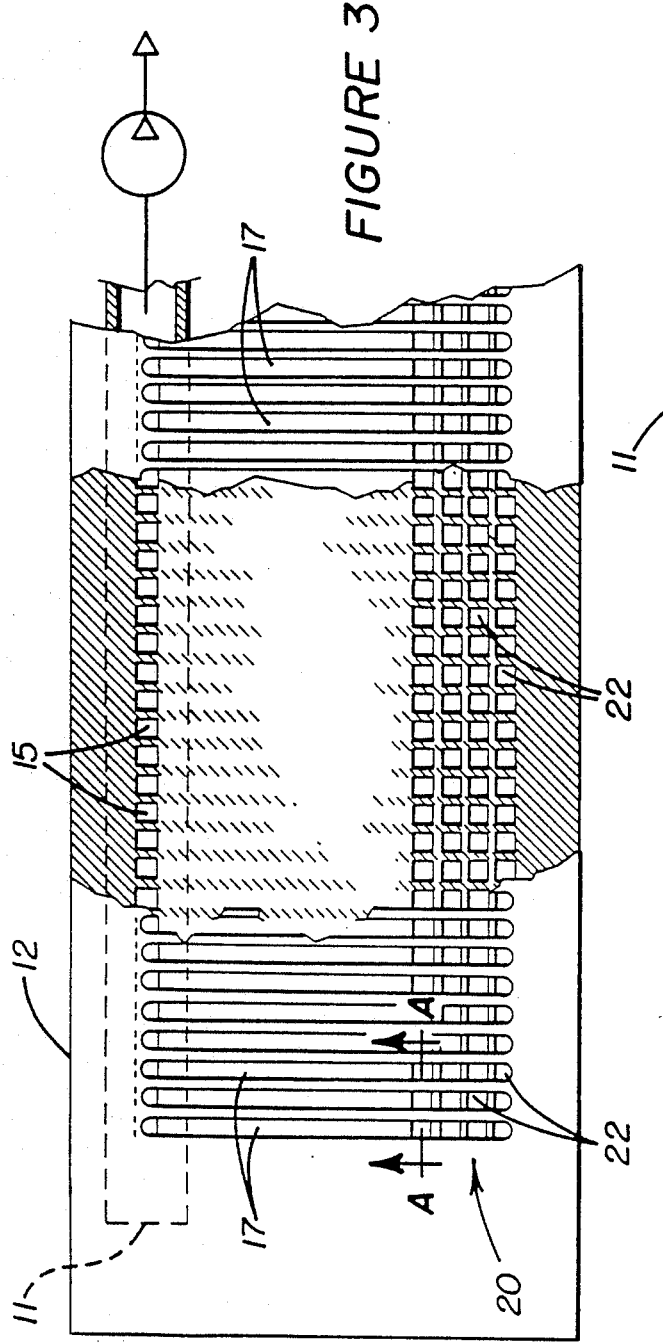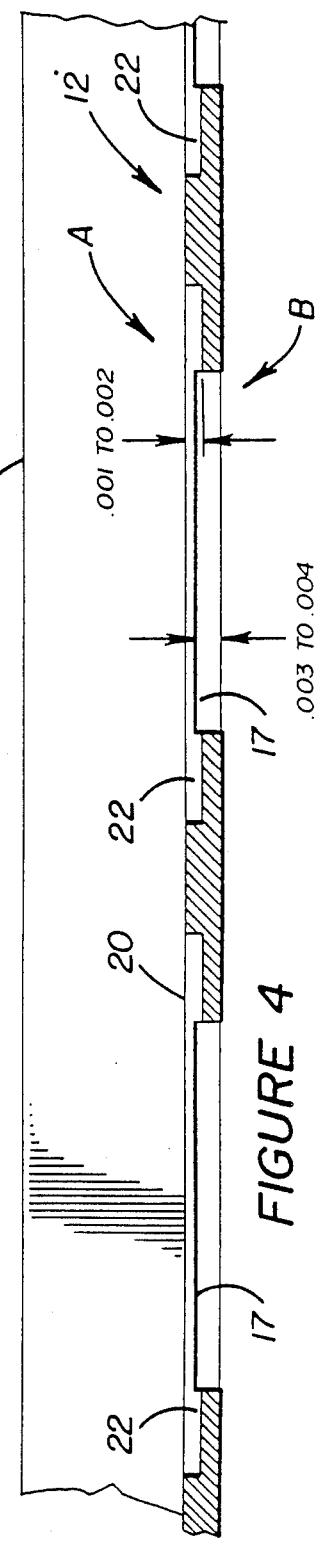

HIGH RESOLUTION ELECTROSTATIC PLOTTER, PRINTER OR THE LIKE INCORPORATING A STATIONARY WRITING HEAD

This application is a continuation in part of copending application Ser. No. 166,716 now U.S. Pat. No. 4,878,071 entitled "A PAPER TRANSPORT AND PAPER STABILIZING SYSTEM FOR A MULTI-COLOR ELECTROSTATIC PLOTTER", recently executed and filed on Mar. 11, 1988 which is incorporated herein by reference.

This invention relates generally to the field of plotters, printers or the like and particularly to an electrostatic plotter incorporating a movable vacuum transport belt providing a plotting surface which conforms to an elliptical path. During plotting operations only the transport belt is shifted laterally while the writing head remains stationary. This results in simplified operation and superior resolution, even upon multiple color passes. The present invention also achieves considerable savings in terms of manufacturing and maintenance costs as compared to prior art electrostatic plotters.

The copending application Ser. No. 166,716 was directed to a transport belt incorporating a vacuum holddown means for providing complete registration and stabilization of a recording medium with respect to a writing head and toner system. There, it was found that a vacuum attach means having a surface flush with the slick surface of a metallic transport belt eliminated any non-conformities which could trap air. Thus, the vacuum attach means in combination with the slick surface of the belt enabled a vacuum to be applied progressively to the entire contacting surface of a recording medium supported on the transport belt. This resulted in a multipass electrostatic plotter, printer or the like wherein the recording medium was registered with a previously unattainable degree of accuracy on multiple writing passes.

It has since been discovered that the registration of a recording medium provided by the vacuum hold-down system described in the parent application in combination with the slick surface of the metal transport belt is such that only the recording medium needs to be moved with respect to the writing head on multiple writing passes. That is, the writing head no longer needs to be actively tracked to a previous pass of written information. Instead, the transport belt and recording medium are moved back and forth as well as laterally with respect to a stationary writing head.

In prior art multi-pass raster line printers, plotters or the like, the present combination of a movable transport belt with respect to a fixed writing head was not believed possible. Previously, there was no satisfactory means for sufficiently stabilizing a recording medium on a transport belt for multiple writing and toning passes in an electrostatic plotter to permit an image to be printed by moving only the belt relative to a stationary writing head. This inability to completely stabilize a recording medium resulted in severe color to color registration problems and inaccuracies on multiple writing and toning passes.

The typical prior art color raster line plotters, which are of multipass nature, rely on a novel but unreliable system to achieve adequate color to color registration. This system consists of writing tick marks during the first black pass along both edges of the paper. During subsequent passes an optical system reads these marks and feeds back any dimensional or position of changes in the paper to the writing control system and paper tracking system. This method works well for correcting the typical positional movement of the paper, but it cannot correct for paper growth in the direction parallel to the direction of travel. The registration marks of prior art systems that are plotted along the edges of the paper are unsightly compromises. Also, prior art web based plotters require significant operator time to precisely align and thread the paper into the plotter every time a new plot is to be generated. The necessity of printing registration marks also has the disadvantage of generating wasted paper every time a new plot is completed.

The single pass web electrostatic plotter was an attempt to solve the registration problem and increase plotting speed. However, this method has the disadvantage of placing very tight constraints on the toning system. In order to take advantage of the high potential output speed, very little time is allowed for the toners to dry adequately. The single pass system also typically requires four expensive writing heads and four vector to raster controllers instead of the single head and single controller required by the multipass system. Registration can still be a problem, unless the four writing heads are very precisely lined up relative to each other and the paper does not move significantly during the printing process.

A more recent attempt at solving the paper stabilizing problem was partially successful with the advent of a color electrostatic plotter employing a rotating drum and helically scanning head and toning system. The salient advantage of the helical scanning drum system is that cut sheet paper is loaded on the drum automatically and held down by vacuum, while a small writing head and toning shoe helically write the image on paper. This system has the disadvantage of a relatively small writing head and toning system which must be very precisely and compliantly mounted to the traveling carriage. Further disadvantages to helical scan plotting are overwhelming. For example, the adjacent band to band writing and toning "edge effects" are very difficult, if not impossible, to overcome. The rigid drum acting as a backing surface creates a very harsh environment for the dielectric paper. Excessively high head pressures are required to achieve adequate writing quality, thereby resulting in damage to the dielectric coating of the paper.

A disadvantage of prior art plotting systems is the electrical complexity necessary to track a movable writing head precisely to a previous pass of written information when paper is undergoing positional instability due to changes in humidity and temperature. Precise stabilization of the paper is necessary in order to obtain proper resolution and an improved degree of color to color registration. It is known that superior and consistent color rendition from a raster type plotter requires a pass to pass registration of better than one half the dot spacing. At typically 400 dots per inch, the accuracy required is 30 micrometers. Since dielectric paper (or any unsealed paper) grows and shrinks with very small changes of humidity during a plotting cycle, it is very important to keep the paper stabilized during subsequent plotting passes. Another very important requirement of the electrostatic plotting process is that the writing head to paper interface must be very intimate (± micrometer) across the whole width of the paper, without applying excessive pressure.

A further disadvantage of prior art plotter or printing systems incorporating movable writing heads is the mechanical complexity of structure necessary for precisely tracking each of the numerous writing nibs of a writing head to previous passes of written information to provide proper resolution and adequate color to color registration. The tracking structure of prior art plotters requires considerable upkeep and maintenance in order to assure accuracy.

In addition, prior art plotting systems are extremely expensive to manufacture. For example, the sale price of a typical high resolution electrostatic plotter is in the neighborhood of $100,000. This cost is due largely to the electrical and mechanical complexity necessary to precisely track a writing head to previous passes of written information while maintaining high resolution.

In order to minimize registration problems and to enhance resolution and printing speed it would be advantageous to completely stabilize a recording medium on a paper transport system which could be moved quickly and precisely with respect to a stationary, writing head. This would enable the mounting structure of a writing head to be greatly simplified. Such a simplified, stationary writing head would minimize the complexity of the tracking system and would reduce the costs of manufacturing and maintenance associated with the typical prior art multipass raster line plotter or printer.

SUMMARY OF THE INVENTION

In order to overcome the foregoing disadvantages of known, multipass, raster line printers and plotters, the present invention provides a paper transport and registration system which completely stabilizes the recording medium such that only the transport belt and recording medium are moved back and forth or laterally with respect to a stationary writing head during the different plotting or writing passes. The writing head advantageously contacts the recording medium across its entire width.

A very important benefit of the present invention is that the mounting structure of the writing head is now simplified to an ordinary flexure mount. This greatly reduces mechanical and electrical complexity and consequently, the costs of manufacturing and maintenance associated with a multipass, raster line plotting or printing system. The apparatus according to the present invention includes a flexible but stable, continuous metal belt, which in the preferred embodiment is disposed in an elliptical path past a stationary writing head and is supported and driven by at least one roller means. The transport belt has a vacuum attach area disposed across its full width for engageably contacting a leading and trailing edge of paper or other recording material disposed thereon. A unique feature of this vacuum attach area is the strong vacuum hold down force provided in the direction of paper travel. The force of the applied vacuum is of such an unexpected magnitude that air is progressively removed from under the paper along the length of the belt, thereby keeping the entire surface of the paper in very intimate contact with the belt during the plotting cycle.

It has been found that paper or other recording medium now can be precisely registered to the transport belt and moved back and forth as well as laterally, with respect to a stationary writing head and toning system without any distortion. A servo mechanism including an eccentric and a lever move the transport belt laterally with respect to the writing head by altering the axis of one of the supporting rollers.

The total circumference of the belt is slightly larger than the sheet of paper the system is designed to hold. An automatic feed and outer system supplies the paper from a supply roll to the leading edge vacuum attach region, which then seizes the paper and stretches the paper onto the belt. When a desired amount of paper has been metered out, the paper is cut and attached by vacuum onto the trailing edge. Once the paper has been stretched onto the belt it is completely stabilized.

Extraordinary stability results from the fact that the front or top surface of the dielectric paper forms basically a hermetic seal, and the backside of the paper is sealed by the belt. This enables all air to be drawn out from the contact region between the surface of the belt and the paper.

The apparatus according to the present invention provides a significant advantage over the prior art in that it enables the plotting surface of a recording medium in a multipass color raster line printer or plotter to conform to an elliptical path past the stationary writing head. Thus, the recording medium stabilized on the plotting surface is doubled back upon itself as it is rotated by the transport belt past a stationary writing head, without distortion or loss of registration. This configuration results in a desirably large effective plotting area provided in a much more compact, portable system than was previously possible.

The apparatus according to the present invention provides a further advantage over the prior art in that it enables the recording medium of a multipass electrostatic plotter or the like to be tracked precisely to preceding passes of written information at one-half the distance between the writing nibs of prior art plotters, by moving only the transport belt and recording medium with respect to a stationary writing head. For example, a first pass of evenly spaced dots is written by the stationary writing head upon a recording medium which is completely stabilized according to the present invention. Then, the transport belt and the stabilized recording material can be shifted horizontally a distance equal to the diameter of one dot. This is done by varying the angle of a roller means with respect to the plane of the transport belt. Upon a successive pass of the record material past the stationary writing head, the transport belt and the stabilized, recording medium can be shifted again laterally by one half the distance between the dots already written by the writing nibs. That is, merely by varying the angle of a supporting roller means, the transport means can be shifted laterally on repeated writing passes such that another row of dots can no be accurately centered between the dots previously written by the writing nibs. It will be appreciated that the effective plotting resolution may be doubled without doubling the number of high voltage drivers and the number of nibs on the writing head.

The present invention thus achieves enhanced resolution and printing quality, while at the same time reducing the electrical and mechanical complexity of a plotting system by eliminating the tracking system for a writing head. This results in a significant savings in terms of the cost of manufacturing and maintenance. The present invention also provides the advantage of achieving superior resolution with a simplified writing head and a reduced graphics dot memory.

BRIEF DESCRIPTION OF THE DRAWINGS

These and other advantages of the present invention may be appreciated from the following detailed description of the preferred embodiment together with the drawings in which:

FIG. 3 is a bottom view of the vacuum attach means according to the present invention; and FIG. 4 is a section view along section A—A of FIG. 3.

DETAILED DESCRIPTION

Figure 1:
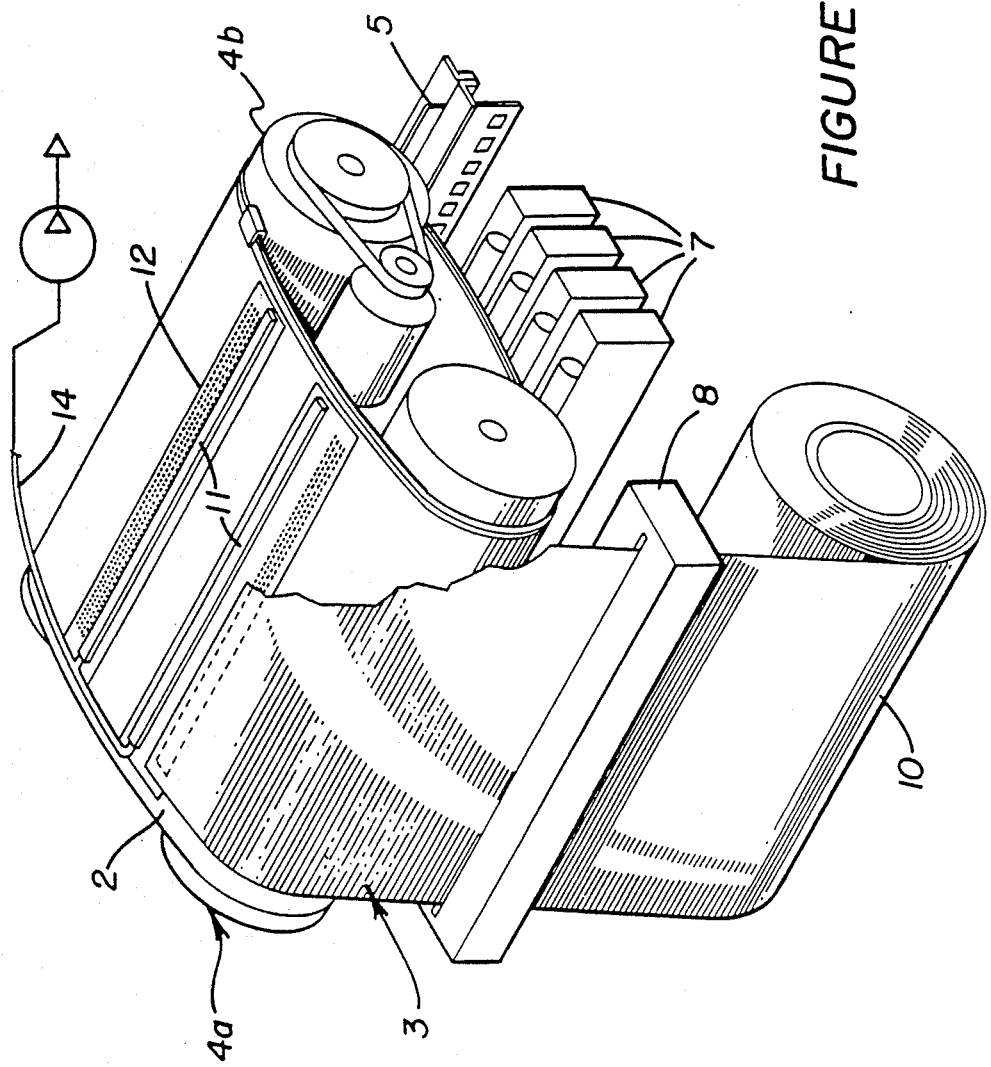
FIG. 1 is a perspective view of a first embodiment according to the present invention.

Referring to FIG. 1, an apparatus according to the preferred embodiment provides a multipass color electrostatic raster line plotter or printer 1. However, the present invention is applicable to any multipass raster line plotter, printer or the like employing thermal or other writing technologies. In a preferred embodiment, electrostatic plotter 1 employs a flexible transport means 2 for registration thereon of a recording medium 3. Transport means 2 is, in a preferred embodiment, a continuous, thin, flexible but stable belt consisting of a stainless steel or nickel material having a thickness of approximately 0.002–0.005 inches. Transport belt 2 is provided with a vacuum attach means 12 for stabilizing and for providing registration thereon of recording medium 3. In the preferred embodiment, transport belt 2 is suspended and stretched by two rollers 4a and 4b, respectively. Rollers 4a and 4b function as a means for passing the recording medium 3 past a stationary writing head 5.

As will be explained, the exceptional registration provided by the vacuum attach means 12 enables the transport belt 2 and recording medium 3 stabilized on the belt to be moved laterally as a unit with respect to a stationary writing means 5. The writing means 5 is fixed in the lateral direction, and extends across the full width of the recording medium. The transport belt 2 is slightly larger than the recording medium 3 which is attached before the writing process begins. In the preferred embodiment, the recording medium 3 comprises conventional recording paper. The recording medium or paper 3 is attached to the transport belt 2 by the vacuum attach means 12 which initially applies vacuum to the leading and trailing edges of the paper. The effect of the vacuum quickly spreads beyond the leading and trailing edges to thereby progressively evacuate all of the air from between the paper and the transport belt 2 such that the paper becomes perfectly registered to the transport belt. This is achieved with the preferred embodiment by assuring that the recording paper has a plasticized, extremely smooth undersurface which is to be in contact with the top or paper supporting surface of transport belt 2. The smooth surface of the paper 3 interfacing with the slick metal surface of the belt enhances the rigid adherence and registration of the paper 3 to the belt 2 because the strong vacuum provided by vacuum attach means 12 progressively removes all air from the space between the smooth undersurface of the paper 3 and the top surface of the belt 2. It will be appreciated that extraordinary stability results from the fact that the front or top surface of the dielectric paper forms basically a hermetic seal, and the backside of the paper is sealed by the belt. This enables all air to be drawn out from the contact region between the surface of the belt and the paper.

A writing means 5 for printing information on the recording medium or paper 3 is provided by a stationary writing head which is supported by an ordinary flexure mounting structure represented schematically at 6. Flexure mounting structures are well known in the art. It will be appreciated that many forms of flexure mounting structures could be implemented in the apparatus according to the present invention by a person skilled in the art without undue experimentation. Accordingly, details of the flexure mounting structure are omitted. The flexure mounting structure 6 has a single direction up and down motion to make clearance for a vacuum attach manifold 11.

It will be appreciated that the stationary nature of the writing head 5 provides an advantage over prior art electrostatic plotting systems, because the writing head 5 does not need to be tracked precisely to a previous pass of written information. The writing head 5 is stationary and information is printed on the stabilized recording medium 3 by moving only the transport belt 2 with respect to the stationary writing head 5. The writing head 5 is configured as an elongate structure disposed for contacting the paper 3 across its entire width as the transport belt 2 proceeds along its axis of travel.

The writing head 5 is also located in a region, which when engaged against the belt 2, is riding against the most compliant part of the belt 2. Means for applying toner to the paper 3 also engages the belt. In the preferred embodiment, the means for applying toner comprises a toner assembly 7. Toner is applied by four toning stations, in the toner assembly 7 containing a black, cyan, magenta, and yellow toner fluid. The toner assembly 7 is located adjacent to the writing head 6 and also rides against a compliant part of the belt 2. Each toning station comprising toner assembly 7 has the ability to move up and down for selection as required during the sequential color passes.

It will be appreciated that the stationary writing head 5 eliminates the need for complex circuitry which would ordinarily be needed in the prior art to track the writing head 5 laterally precisely to successive passes of written information on the paper 3. The simplified flexure mount of the writing head 5 also simplifies the electrical and mechanical complexity of a typical prior art electrostatic plotting system and reduces the cost of manufacturing.

The flexure mounted, stationary writing means 5 provides significant advantages in terms of the cost of repair and maintenance in contrast with prior art electrostatic plotting systems. Because only the transport belt 2 and paper 3 are moved with respect to the stationary writing head 5, the accuracy of the system can be maintained for a longer period of time as compared to prior art electrostatic plotters with movable writing heads which must be actively tracked to various positions on the recording medium on each successive writing pass. Because the stationary writing head according to the present invention is practically immune to mechanical breakdown, maintenance costs can be greatly reduced. The present invention thereby provides a much more reliable, maintenance free electrostatic plotting system at a reduced cost.

The loading of the paper 3 for plotting is shown in FIG. 1. An automatic feed and cutter system supplies paper from a supply roll 10 to a cutting means 8. The automatic feed and cutter system supplies the paper to the leading edge vacuum attach region 12 (on roller 4b) which seizes the paper 3 and stretches it onto the belt 2. When a desired amount of paper 3 has been metered out, the paper is cut by cutting means 8 and attached by the trailing edge vacuum attach means 12 on roller 4b.

Figure 1A:
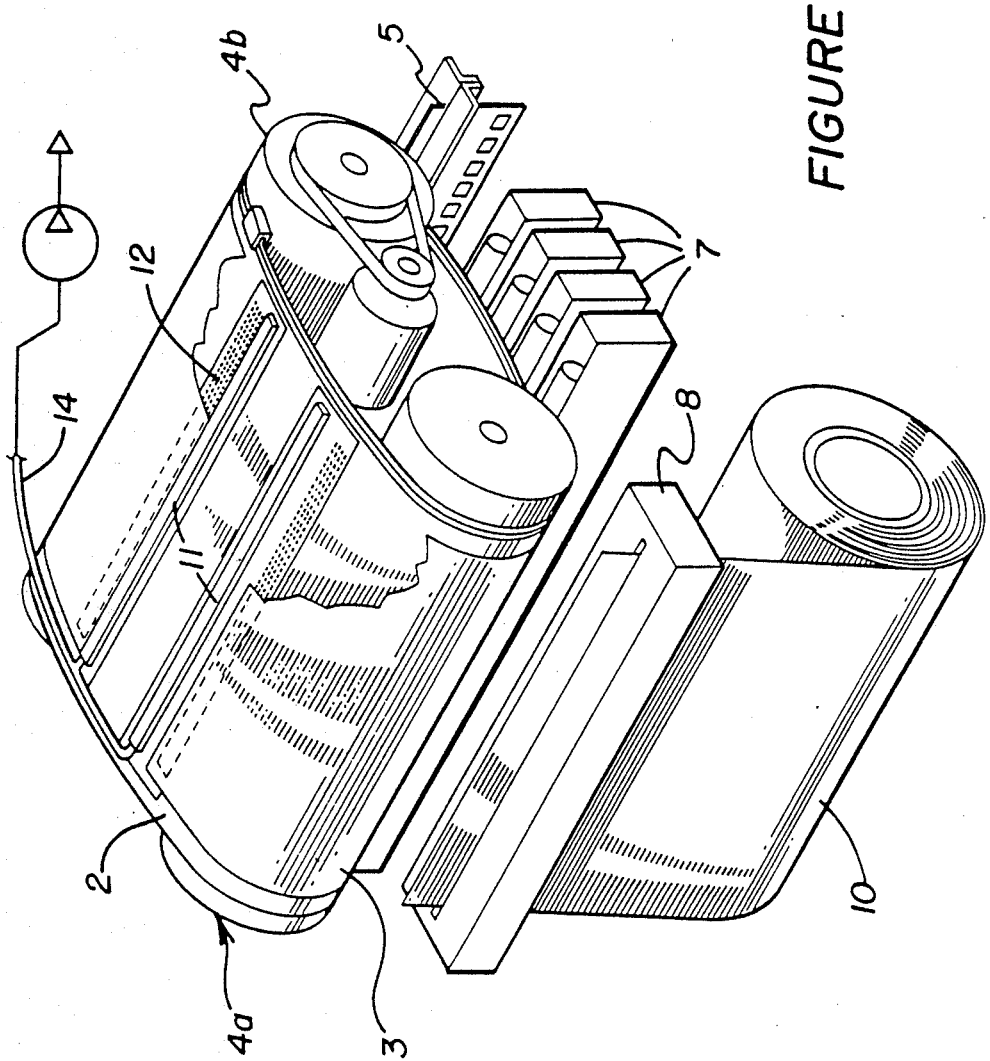
FIG. 1a is a perspective view of the embodiment of FIG. 1 with paper in a fully loaded position.

FIG. 1a shows the paper 3 in a fully loaded position on the belt 2 after having been cut by cutting and feed mechanism 8. The paper 3 is now ready for plotting. Extraordinary stability results from the application of a vacuum by vacuum attach means 12 to the leading and trailing edges of the belt 3. The underside of the paper is sealed by the belt 2. The slick paper supporting surface of the belt in contact with the plasticized surface of the recording medium or paper 3 enables all air to be drawn out from the contact region between the surface of the belt 2 and the paper 3. Accordingly, the paper can be precisely and invariantly registered and completely stabilized on the vacuum belt 2 even as it turns over rollers 4a and 4b in making almost a complete revolution past the stationary writing head 5 and toning assembly 7.

In operation, the belt 2 with the loaded paper 3 begins its first color pass by momentarily coming to a stop with the leading edge of the paper being close to the writing head 5. The belt 2, along with the paper 3, make substantially a complete revolution as the writing and toning is in progress. There is now no necessity for lateral movement of the writing head due to the substantially invariant registration of the recording medium on the transport belt. Only the transport belt is moved laterally on multiple writing passes with respect to the stationary writing head 5 which is disposed across the full width of the recording medium 3.

Figure 1B:
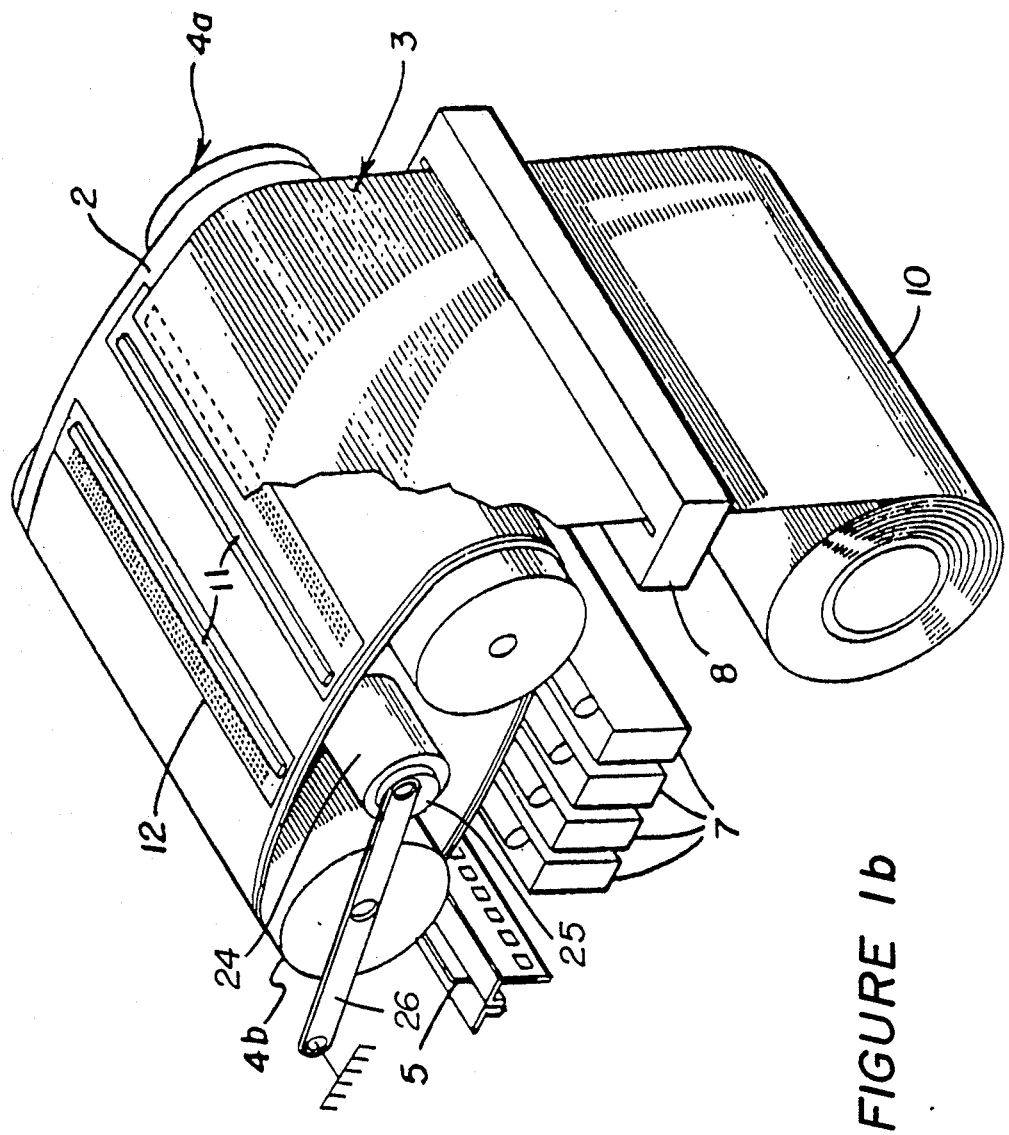
FIG. 1b is a perspective view of the opposite side of the embodiment of FIG. 1.

Referring to FIG. 1b, in a preferred embodiment the recording material 3 is moved laterally on successive writing passes with respect to the stationary writing head 5 by a means for tilting the angle of at least one of the supporting rollers 4a or 4b. This also alters the plane of the transport belt 2 with respect to the writing head 5. The means for tilting the angle of a roller (4b for example), may be a simple, servo activated lever 26. As shown in FIG. 1b, a gear motor 24 is coupled through an eccentric 25 and lever 26 which has a connection with the central axis of roller 4b. Lever 26 provides a means for tilting the roller 4b in response to servo commands according to well known methods of servo control. The up and down motion of lever 26 changes the angle of the central axis of roller 4b and moves the plane of the transport belt 2 and the recording medium 3 with respect to the stationary writing head means 5. Thus, by selectively tilting the angle of roller 4b, the recording medium 3 is shifted laterally with respect to the stationary writing head 5.

Upon completion of plotting operations, the writing head 5 disengages from the paper before it reaches the approaching trailing edge, and the vacuum belt 2 comes to a complete stop with the toning system close to the trailing edge of the paper 3. The toning system 7 then drops away from the paper. The transport belt 2 next makes a complete rewind and the process is repeated with the next color, until all four color passes are completed. The paper 3 is then stripped from the transport belt 2 and ejected during the final rewind. A means for feeding a new sheet of paper 3 from supply roll 10 and means for cutting the paper to a desired length are provided by cutting and feed mechanism 8.

It will be appreciated that the present invention provides extreme compactness of system size while greatly increasing the active plotting area. These seemingly contradictory advantages are attainable because the present invention enables the transport belt 2 to conform to a continuous elliptical path past the writing head 5 and toning system 7. The present invention also enables the recording medium 3 to be completely stabilized on the surface of the elliptically configured belt 2 without loss of registration even as the belt 2 turns corners as shown in FIG. 1a. Thus, the recording material and belt make nearly a complete revolution past the writing head 5 as the plotting operation takes place, without distortion or loss of registration. A conventional platform based plotter would have to be prohibitively long in order to achieve the same plotting area of the present invention.

Figure 2:
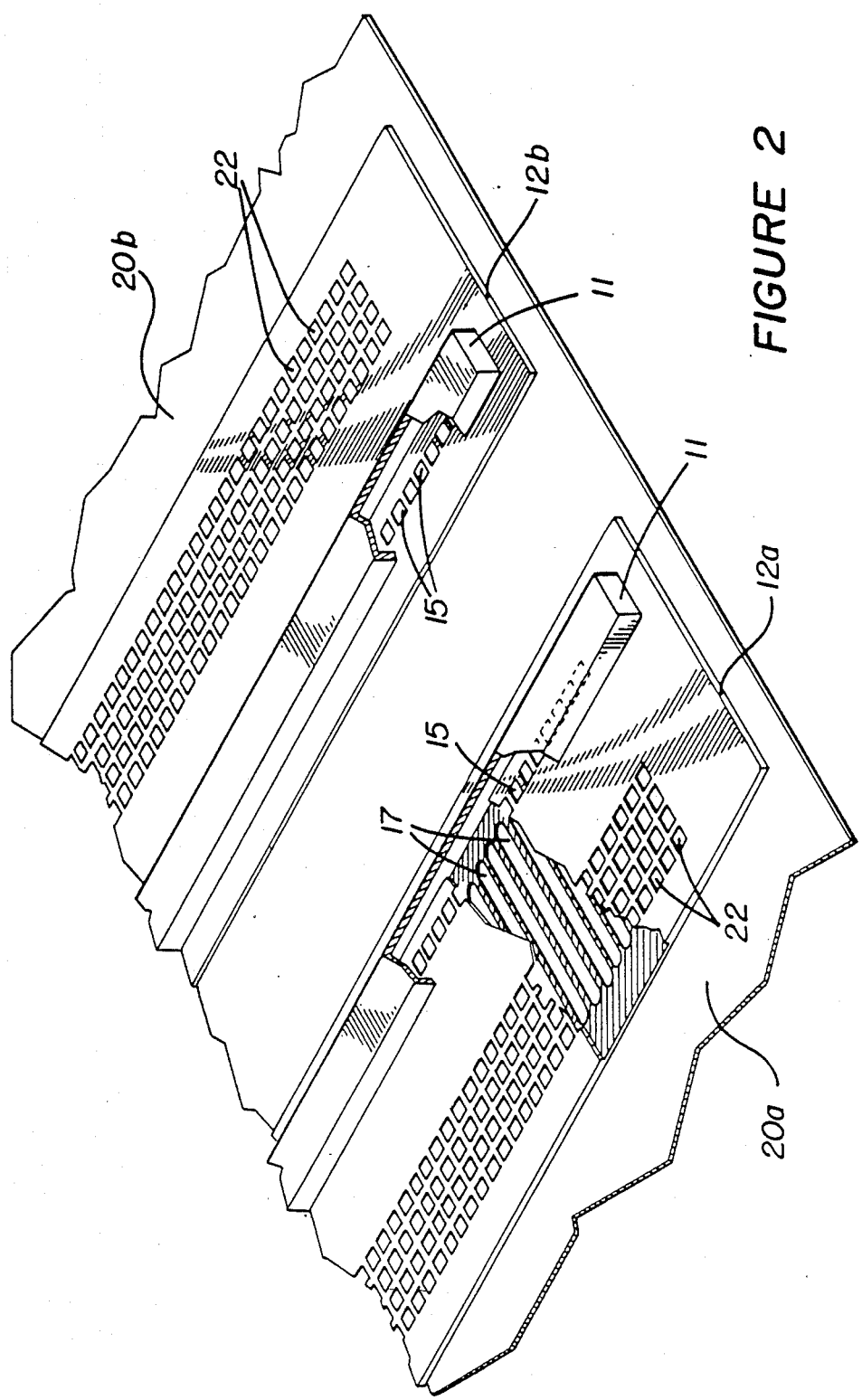
FIG. 2 is a perspective detail view of the vacuum transport belt according to the present invention.

Referring now to FIG. 2, the feature of the stationary writing head 5 and laterally movable transport belt 2 according to the present invention is made possible by the extraordinary vacuum hold down effect produced by the vacuum attach means 12a and 12b in combination with the slick surface of the transport belt 2. In the preferred embodiment, two vacuum attach means 12a, 12b are fixedly attached or bonded to the surface of transport belt 2 by any convenient method. Vacuum attach means 12a, 12b are provided to engage the leading and trailing edges, respectively of a recording material to firmly register the paper to the transport belt 2.

Vacuum attach means 12a, 12b comprise in the preferred embodiment a pair of flexible brass strips, approximately 0.005 inches thick which are bonded to form a substantially flush contact with the surface of the vacuum belt 2. It is important that the bonding means not interfere with the substantially flush arrangement of the vacuum attach means 12a and 12b with the surface of the belt 2. For example, the vacuum attach means 12a and 12b could be laser welded to the metallic transport belt 2. Thus, the paper contacting surface of each vacuum attach means 12a, 12b is virtually integral with the paper supporting surface of the belt 2. This is important in order to achieve a seal tight relation between the undersurface of the paper 3, and the top or paper supporting surface of the belt 2 and vacuum attach regions 20a, 20b of vacuum attach means 12. The substantially integral surface formed by the belt 2 and extremely thin vacuum attach means 12 is essential to prevent the formation of any nonconformities which could trap air and degrade the intensity of the applied vacuum. The vacuum applying strips which form the vacuum attach means 12 are disposed across the width of the transport belt 2 and form a right angle with the edge of the belt 2. A vacuum plenum or manifold 11 is disposed on each surface of the vacuum attach means 12a, 12b and extends along the entire length of each the vacuum attach means 12a, 12b. The vacuum plenum 11 has a means for attachment to a vacuum source as shown by the vacuum hose 14 in FIG. 1.

Referring again to FIG. 2, the vacuum plenum provides a vacuum for the attach regions 20a, 20b of the vacuum attach means 12a, 12b which come in contact with and hold down the leading and trailing edges of the paper. The vacuum plenum forms a raised rectangular vacuum chamber which extends along with width of the vacuum belt 2. The outer sides of the vacuum plenum 11 are preferably disposed in combination with each vacuum attach regions 20a, 20b to provide a stable means for initial alignment and registration of the leading and trailing edges of the paper to the vacuum belt 2. That is, when beginning the writing operation, the paper can be aligned against the outer sides of the vacuum plenum and thereby registered initially in a proper position with respect to the writing head 5 and toner assembly 7. The application of vacuum to the underside of the leading and trailing edges of paper 3 in contact with vacuum attach regions 20a, 20b then completes the registration of the paper to the belt 2.

Further details of the vacuum attach means are shown in FIGS. 3 and 4. FIG. 3 shows the underside of a vacuum attach means 12. Referring to FIG. 3, vacuum plenum 11 is disposed over a series of vacuum receiving bores 15. Each bore 15 has a connection through an associated channel 17 to a series of primary vacuum applying apertures 22. When the vacuum attach means 12a, 12b are bonded to the transport belt 2, the channels 17 provide sealed vacuum passages in the interior of vacuum attach means. Thus, the channels 17 provide a means for transferring essentially all of the vacuum from the vacuum plenum 11 to the vacuum attach region 20. The channels 17 are extremely shallow in order to transfer the vacuum beneath the thin vacuum attach means 12 so as not to interfere with the seal tight relation between the recording medium 3 and the substantially integral surface formed by the vacuum attach means 12 and the belt 2. The primary vacuum apertures 22 are disposed to form the vacuum attach region 20 of the vacuum attach means 12. Primary vacuum apertures 22 provide a means for applying a strong vacuum to the leading and trailing edges of the recording material. In the preferred embodiment, primary vacuum apertures 22 are a series of closely spaced parallel rows of apertures. Each row of apertures is connected with an associated channel 17 through which vacuum is transferred from the vacuum plenum 11. Primary vacuum apertures 22 directly contact the leading and trailing edges of the paper as other recording material disposed on the surface of the belt.

It will be appreciated that the vacuum produced in the vacuum plenum 11 is transferred to the primary vacuum applying apertures 22 of the vacuum attach means 12 without any perceptible leakage. The primary vacuum apertures 22 come in sliding contact with the underside of the paper 3 as it is initially registered against the sides of the plenum 11 The vacuum produced by the primary vacuum apertures 22 is particularly strong and is provided in the direction of paper travel. It has been found that this vacuum unexpectedly provides not only a precise, invariant registration of the leading and trailing edges of the paper to the belt, but the vacuum applied by the primary vacuum apertures 20 also travels progressively under substantially the entire surface of the recording material, thereby rigidly adhering an entire sheet of paper 3 to the transport belt 2.

It has been found that the spread of vacuum between the lower surface of the belt 2 is enhanced by the use of a metallic material for the transport belt 2. The slick, smooth surface of a metallic belt formerly would have been perceived as a detriment to the proper registration of paper in an electrostatic line plotter. In the prior art, it was not deemed practical to stabilize paper on a metal transport belt because the slippery, polished surface of the metal was believed to preclude proper adhesion of the paper to the surface of the metallic belt. However, with the flush, substantially integral surface formed by bonding the thin vacuum attach strips 12a, 12b to a metallic vacuum belt 2 of the present invention, the slick metal surface has been found to enhance the application of vacuum to the paper 3 by eliminating nonconformities which would create air pockets. Thus, the vacuum applied by the vacuum attach means 20 actually spreads unimpeded between the slick metal surface of the belt and the overlying paper to form an air tight contact between the paper and the metallic belt. In this regard, superior registration of paper to the belt is achieved when the underside of the paper 3 in contact with the slick surface of the metallic belt is plasticized or otherwise free of porous regions which could allow air flow and reduce the vacuum.

With regard to transportation and stabilization qualities, it has also been found that metal is the preferred material for the vacuum transport belt 2 of the present invention. In a so called web type paper transport system for an electrostatic plotter or the like, the paper or other recording medium is always subject to a certain amount of pulling and distortion during the writing process. The paper also grows and shrinks in size due to changes in humidity. Additionally, a web transport method of the prior art is subject to some distortion in operation when transporting the paper. All of the foregoing factors degrade the proper registration of the recording material to the transport belt and result in poor resolution and poor color to color registration.

In contrast, the metal belt of the present invention does not distort when pulled and thereby provides a stable base by which the vacuum attach means 12a, 12b of the present invention may achieve precise registration of the paper at all times during the writing scheme. Distortion may be reduced or eliminated because a metal belt is compliant in the vertical or Z axis while maintaining rigidity in the X and Y axes. The registration of paper achieved by the apparatus according to the present invention is extremely important in an electrostatic plotter or printer because of the precise tolerance which must be maintained between the writing head and the paper surface. In a conventional electrostatic plotter, the writing head must be maintained in intimate contact with the paper across its entire width. The clearance between the end of the writing head and the top surface of the paper is typically much less than 1/10000 of an inch.

The compliant nature of the metal belt in the Z axis (vertical direction) and its rigidity in the X and Y axes provide significant advantages over prior art paper transport systems. The property of compliancy enables precise registration of the paper even with changes in alignment between the writing head and the paper surface in contact therewith due to differential thermal expansion and changes in the surface texture of the paper as may be caused by increased humidity. The metal belt of the present invention stabilizes the paper, and does not distort, grow or shrink appreciably with changing temperature and humidity. This enables a more precise registration of paper than was previously possible. The foregoing advantages of the metallic belt used in present invention also enhance color to color registration and resolution.

It has been found that the vacuum hold down feature in combination with the metallic or slick surfaced transport belt enables, for the first time, a writing head 5 in a multipass, raster line printer, plotter or the like to be fixed in a lateral position and mounted by an ordinary flexure mounting structure. It also has been found that a recording medium now can be maintained in perfect registration with respect to a stationary writing head on successive writing passes by moving only the transport belt laterally. This has the advantage of enabling the present invention to achieve a doubling of the density of dots which can be produced by the writing nibs of a prior art electrostatic plotter. The improved resolution of the present invention occurs as follows. The stationary writing head 5 of a multipass electrostatic plotter according to the present invention, produces a first set of dots from the writing nibs (not shown)as the paper 3 makes a first pass past the writing head 5 and toning assembly 7. On a second pass, the present invention enables the transport belt 2 and the paper 3 which is substantially invariantly stabilized on the transport belt 2 to be moved one half of the distance between the writing nibs or 0.0025 inches. This achieves a doubling of the dots because the writing nibs print a set of dots which may be precisely tracked to the first set and are spaced at only one half of the ordinary distance. For example, on a second pass, the transport belt may be tracked with such precision as to enable the stationary writing nibs to produce another row of dots between two rows dots already written on a previous writing.

A conventional writing head typically prints 200 dots per inch. It is known that paper will grow and shrink a maximum of 4 dots laterally without being stabilized by a metallic vacuum belt according to the present invention. As a result, prior art devices could not track a writing head to a previous pass at the present distance of only one half of the distance between the writing nibs. Moreover, prior art devices cannot stabilize a recording medium on a transport belt in an electrostatic plotter with the degree of invariance achieved by the present invention, and thus cannot employ a stationary writing head with its many advantages.

Prior art electrostatic plotters must incorporate considerable complex circuitry in order to track a writing head to a previous pass of written dots from the writing nibs. In contrast, the present invention achieves superior resolution with an inexpensive, simplified writing head by moving a recording medium laterally as the transport belt makes successive passes past a stationary writing head and toning assembly. Several alternate paper-to-belt attach schemes are possible. One is to significantly increase the vacuum hold down force over the whole area of the paper, not just under the leading and trailing edge. This can be achieved by incorporating micro groves that are about 1 to 25 microns deep and 50 to 200 microns wide over the whole area of the belt 2 under the active paper area. In this embodiment, the pattern of grooves on the belt also must be configured such that a vacuum applied to the grooves produces a coefficient of friction close to unity between the belt and the paper.

Another possible paper attach scheme is to construct the leading or trailing edge attach area of the transport belt in a way not requiring an active vacuum attach region. This could be done by incorporating a mechanical attachment mechanism which clamps the leading and trailing edges of the paper securely in the direction of travel. As long as all of the air can be progressively removed between the undersurface of the recording medium in contact with the slick supporting surface of the transport belt, as taught according to the present invention, the recording material will be substantially invariantly stabilized on the transport belt by a pressure differential even without an active vacuum hold down means. Even though this is not thought to be as stable as the present vacuum attach system, it can certainly be used in a lesser product.

While the invention has been described in connection with what is presently considered to be the most practical and preferred embodiments, it is to be understood that the invention is not limited to the disclosed embodiment but, on the contrary, is intended to cover various modification and equivalent arrangements included within the spirit and scope of the appended claims.

What is claimed is:

1. An improved high resolution plotter, printer or the like comprising:

writing head means for imprinting information on a recording medium;

continuous transport means for supporting said recording medium and for moving said recording medium substantially a complete revolution past said writing head means;

at least one roller means, having a central axis, for supporting and moving said transport means;

means for providing a vacuum to the entire surface of said recording medium adjacent said transport means such that said recording medium is stabilized invariantly in a desired alignment thereon;

means for varying the lateral position of said transport means with respect to said writing head means such that information is imprinted on said recording medium by moving only said transport means with respect to said writing head means.

2. An apparatus as in claim 1 wherein said continuous transport means is configured for moving said recording medium in an elliptical path past said writing head means and has a total circumference only slightly larger than said recording medium stabilized thereon, such that said transport belt and said recording medium make substantially a complete revolution past said writing head means during a given plotting cycle.

3. An apparatus according to claim 1 wherein said writing means is flexure mounted and disposed for conformably contacting said recording medium across its entire width and is otherwise stationary.

4. An apparatus according to claim 1 wherein said means for varying the lateral position of said transport means with respect to said writing head means comprises means for varying the angle of said axis of said roller means with respect to the plane of said transport means.

5. An apparatus according to claim 4 wherein said means for varying the angle of said axis of said roller means further includes a servo activated lever having a connection with said roller means for moving said central axis up or down to thereby vary the lateral position of said transport means with respect to said stationary writing head means.

6. An apparatus according to claim 1 wherein said writing means is disposed across the entire width of said recording medium and has a series of writing nibs, recording medium, each nib being disposed for printing a dot on said recording medium and separated from an adjacent nib by a distance not exceeding 0.005 inches.

7. An apparatus according to claim 6 wherein said means for varying the angle of said roller means shifts said recording medium laterally on multiple writing passes with respect to said stationary writing means at least one half of the distance between said writing nibs.

* * * * *